United States Patent
Song et al.

(10) Patent No.: US 10,778,384 B2
(45) Date of Patent: Sep. 15, 2020

(54) SYSTEM AND METHOD FOR IMPROVED CAPACITY USING CHANNEL MULTIPLEXING

(71) Applicant: Verizon Patent and Licensing Inc., Basking Ridge, NJ (US)

(72) Inventors: Lei Song, Fremont, CA (US); Jin Yang, Orinda, CA (US); Yee Sin Chan, San Jose, CA (US); Jignesh S. Panchal, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/695,696

(22) Filed: Sep. 5, 2017

(65) Prior Publication Data
US 2018/0175977 A1 Jun. 21, 2018

Related U.S. Application Data

(63) Continuation-in-part of application No. 15/384,614, filed on Dec. 20, 2016.

(51) Int. Cl.
*H04L 5/00* (2006.01)
*H04W 72/12* (2009.01)
(Continued)

(52) U.S. Cl.
CPC ........... *H04L 5/001* (2013.01); *H04J 11/003* (2013.01); *H04L 1/08* (2013.01); *H04L 5/003* (2013.01); *H04L 27/26* (2013.01); *H04L 27/2602* (2013.01); *H04W 72/0446* (2013.01); *H04W 72/12* (2013.01); *Y02D 70/00* (2018.01); *Y02D 70/10* (2018.01); *Y02D 70/12* (2018.01);
(Continued)

(58) Field of Classification Search
None
See application file for complete search history.

(56) References Cited

U.S. PATENT DOCUMENTS

| | | | |
|---|---|---|---|
| 8,837,271 B1 | 9/2014 | Mansour et al. | |
| 2005/0232138 A1* | 10/2005 | Byun | H04L 5/023 370/208 |

(Continued)

OTHER PUBLICATIONS

Nokia, Alcatel-Lucent Shanghai Bell, "Increasing PUSCH spectral efficiency in efeMTC," 3GPP TSG RAN WG1 Meeting #88bis, Spokane, USA, Apr. 3-7, 2017, 4 pages.

*Primary Examiner* — Huy D Vu
*Assistant Examiner* — Bao G Nguyen

(57) ABSTRACT

A base station may include one or more processors to receive repetitive data transmitted using a set of subcarriers of a physical resource block (PRB); apply a first orthogonal pattern, assigned to a first user equipment (UE), to a segment of subframes of the received repetitive data; apply a second orthogonal pattern, assigned to a second UE, to the segment of subframes of the received repetitive data, the second orthogonal pattern being different from the first orthogonal pattern; determine first repetitive data, transmitted by the first UE using the set of subcarriers, based on applying the first orthogonal pattern to the segment of subframes of the received repetitive data; and/or determine second repetitive data, transmitted by the second UE using the set of subcarriers, based on applying the second orthogonal pattern to the segment of subframes of the received repetitive data.

20 Claims, 10 Drawing Sheets

(51) Int. Cl.
*H04W 72/04* (2009.01)
*H04L 1/08* (2006.01)
*H04L 27/26* (2006.01)
*H04J 11/00* (2006.01)

(52) U.S. Cl.
CPC ........ *Y02D 70/126* (2018.01); *Y02D 70/1262* (2018.01); *Y02D 70/14* (2018.01); *Y02D 70/142* (2018.01); *Y02D 70/164* (2018.01); *Y02D 70/20* (2018.01); *Y02D 70/21* (2018.01); *Y02D 70/22* (2018.01); *Y02D 70/23* (2018.01)

(56) References Cited

U.S. PATENT DOCUMENTS

| | | | |
|---|---|---|---|
| 2007/0086535 A1* | 4/2007 | Wang | H04B 7/0669 375/260 |
| 2011/0085503 A1* | 4/2011 | Nam | H04L 5/005 370/329 |
| 2011/0096855 A1 | 4/2011 | Youn et al. | |
| 2013/0256533 A1* | 10/2013 | Bae | G01J 3/28 250/339.02 |
| 2014/0153499 A1* | 6/2014 | Wang | H04W 24/02 370/329 |
| 2014/0369223 A1 | 12/2014 | Takeda et al. | |
| 2015/0078348 A1 | 3/2015 | Han et al. | |
| 2015/0229505 A1* | 8/2015 | Porat | H04B 7/0452 370/329 |
| 2015/0327289 A1* | 11/2015 | Hessler | H04W 72/1268 370/336 |
| 2016/0218836 A1 | 7/2016 | Yamamoto et al. | |
| 2017/0171865 A1 | 6/2017 | Hwang et al. | |
| 2018/0176889 A1* | 6/2018 | Chan | H04W 4/70 |

* cited by examiner

Example of 4 Orthogonal Patterns with 4 subframe repetition

FIG. 6

US 10,778,384 B2

SYSTEM AND METHOD FOR IMPROVED CAPACITY USING CHANNEL MULTIPLEXING

RELATED APPLICATION

This application is a continuation-in-part (CIP) of U.S. patent application Ser. No. 15/384,614, filed on Dec. 20, 2016, the content of which is incorporated by reference herein in its entirety.

BACKGROUND

Narrowband technologies, such as Cat-M1 and Cat NB1 refine long term evolution (LTE) technology for use in "Internet of Things" (IoT) and machine-to-machine (M2M) applications. These categories allow for LTE to be power efficient as required by many applications that need a relatively low amount of throughput.

BRIEF DESCRIPTION OF THE DRAWINGS

FIG. 6 is a diagram of an example implementation relating to the example process shown in FIG. 5.

DETAILED DESCRIPTION OF PREFERRED EMBODIMENTS

The following detailed description of example implementations refers to the accompanying drawings. The same reference numbers in different drawings may identify the same or similar elements.

A narrowband solution for a long term evolution (LTE) communication system, such as Cat-M1, may rely on repetitive data transmissions in order to improve coverage. For example, User Equipment (UE) (e.g., an IoT device, an M2M device, a user device, and/or the like) may repeat data in multiple consecutive subframes (e.g., in 10 consecutive subframes, in 30 consecutive subframes, in 100 consecutive subframes, and/or the like) in order to improve coverage. As a particular example, a Cat-M1 UE transmitting voice over LTE (VoLTE) data (e.g., one packet of data) may transmit the data 32 times in 32 consecutive subframes (e.g., where each subframe is 1 millisecond (ms) in duration).

However, transmission of repetitive data by the UE means that other UEs may be prevented from transmitting using the radio resources used by the UE for the repetitive transmission. For example, in a case where six physical resource blocks (PRBs) are available on an uplink (e.g., with 1.4 megahertz (MHz) of bandwidth), if a UE requires three PRBs for a transmission (e.g., 540 kHz), then only two UEs may be supported at a given time. This may cause delay in transmissions by the other UEs, and is not an efficient use of available radio resources.

Some implementations described herein may provide for channel multiplexing that allows a base station to receive and decode repetitive data transmissions from multiple UEs that use the same set of radio resources to transmit the repetitive data. In some implementations, the same set of radio resources allocated to UEs may include a same PRB and/or a same subcarrier of a PRB. Furthermore, in some implementations, UEs may be assigned orthogonal patterns that are applied to repetitive data transmissions, such that the UEs may utilize the same PRB and/or the same subcarrier of a PRB. In some implementations, orthogonal patterns may be assigned to reference signals to facilitate scheduling transmissions of repetitive data and/or scrambling codes may be applied to reference signals to eliminate scheduling interference with neighboring cells or base stations. In some implementations, an interference cancellation scheme may be utilized to account for mobility of UEs. Accordingly, some implementations herein provide more efficient utilization of radio resources used for repetitive data transmissions (e.g., as compared to allowing a single UE to use a given set of radio resources at a given time). Furthermore, delay in a transmission by a UE may be reduced (e.g., since multiple UEs may transmit more frequently).

Figure 1A:
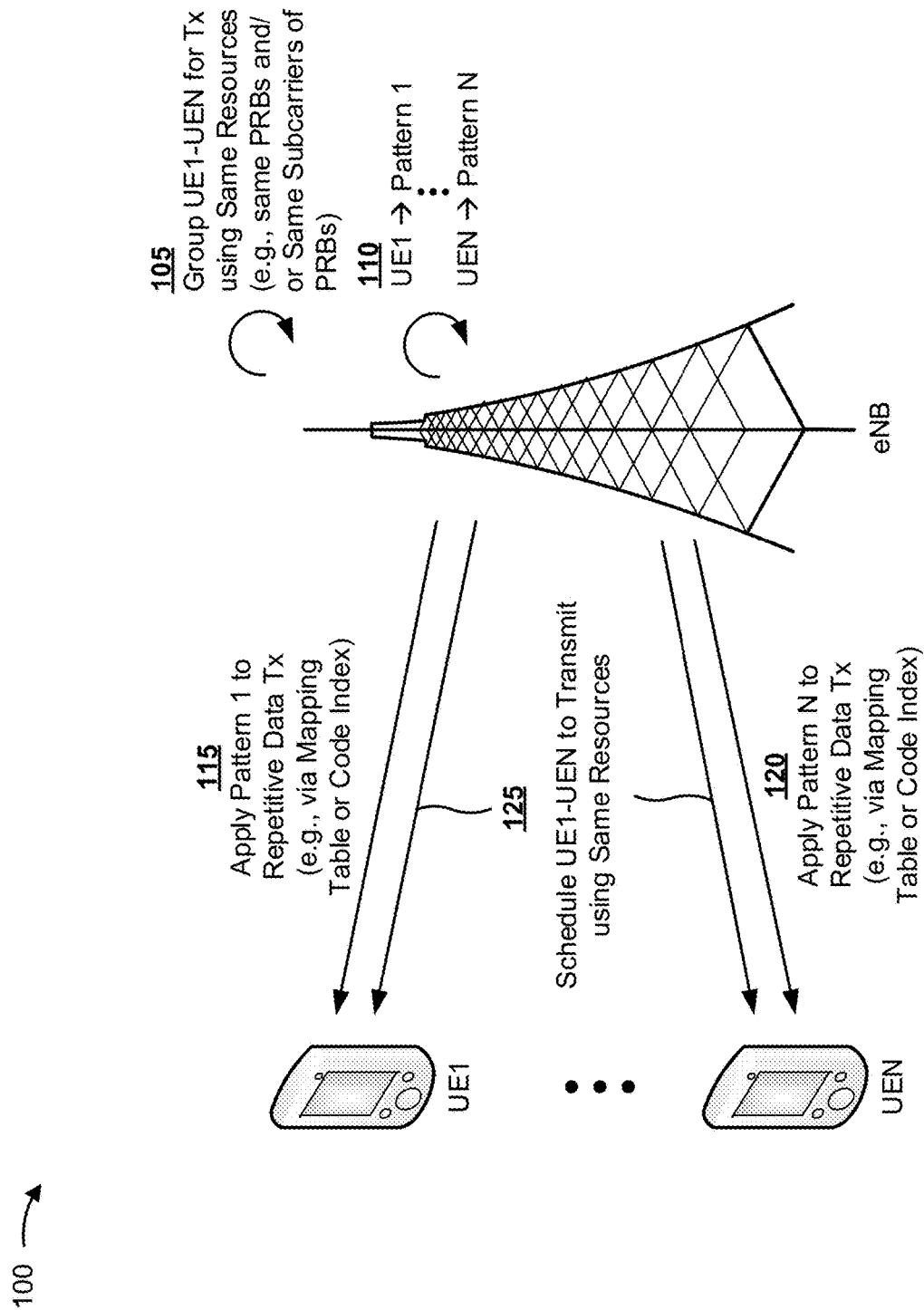
FIGS. 1A and 1B are diagrams of an overview of an example implementation described herein.
Figure 1B:
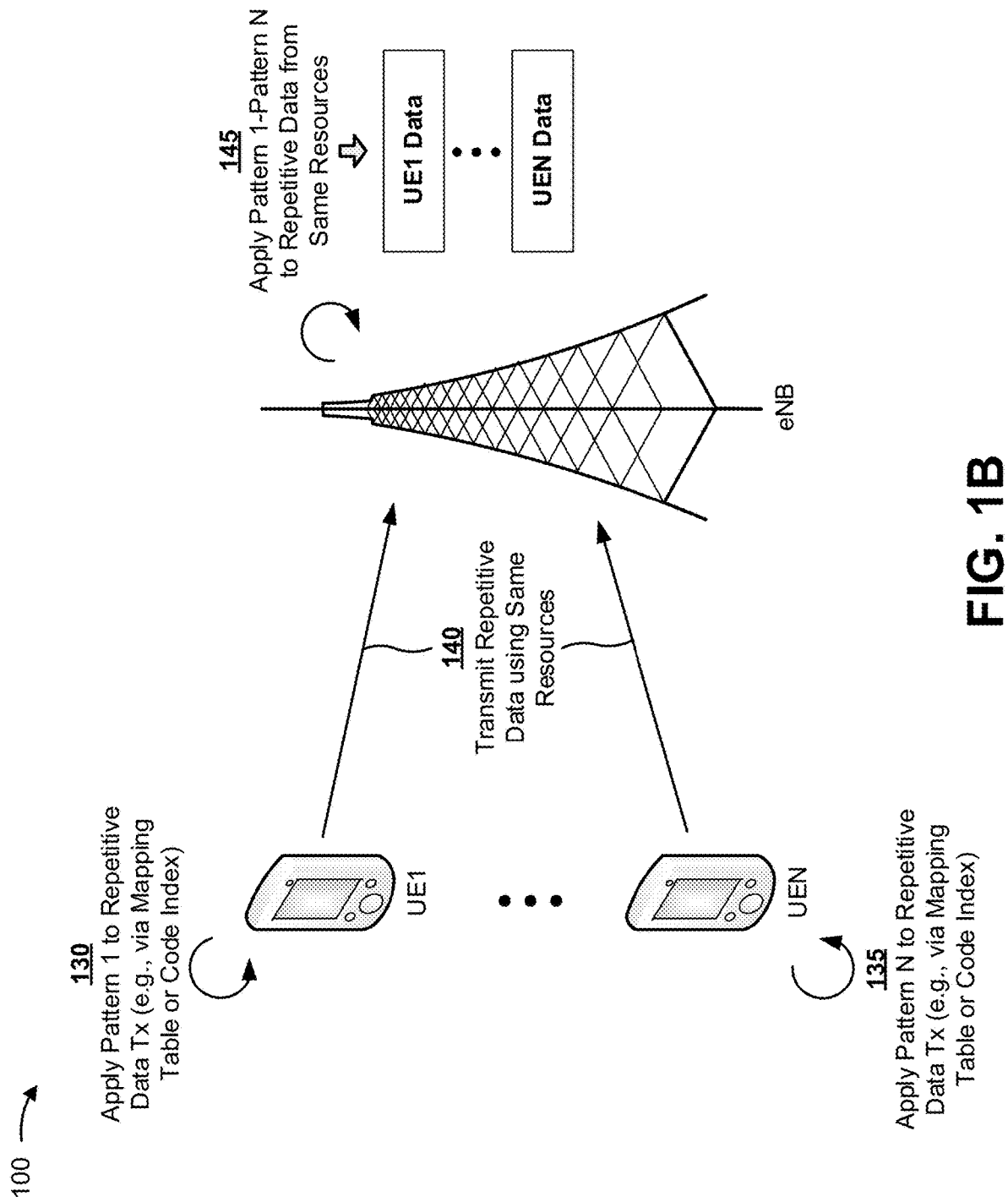

FIGS. 1A and 1B are diagrams of an overview of an example implementation 100 described herein. As shown in FIG. 1A, example implementation 100 may include a number (N, where N>1) of UEs (UE1 to UEN) and a base station, such as an eNodeB (eNB). As shown by reference number 105, the eNB may group UE1 through UEN such that UE1 through UEN may transmit repetitive data using a same set of radio resources. For example, the eNB may group UE1 through UEN to use a same set of PRBs (e.g., one or more PRBs) of eNB and/or a same set of subcarriers (e.g., one or more subcarriers) of a PRB of the eNB.

As shown by reference number 110, the eNB may assign patterns (e.g., orthogonal patterns, identified as pattern 1 through pattern N) to each of UE1 through UEN. As shown by reference numbers 115 and 120, the eNB may provide, to UE1 through UEN, information that identifies a pattern to be applied by each UE. For example, the eNB may broadcast and/or transmit a mapping table to each of UE1 through UEN, may send a mapping index to each of UE1 through UEN, and/or the like. As shown by reference number 125, the eNB may then schedule UE1 through UEN to transmit repetitive data using a same set of radio resources.

As shown in FIG. 1B, and by reference number 130, UE1 may apply pattern 1 to repetitive data to be transmitted by UE1 using the set of radio resources scheduled by the eNB. For example, UE1 may refer to a mapping table and/or pattern index provided by the eNB to determine which pattern is to be applied to the repetitive data. Similarly, as shown by reference number 135, UEN may apply pattern N to repetitive data to be transmitted by UEN using the set of radio resources. Again, UEN may refer to the mapping table and/or pattern index to determine which pattern is to be applied to the repetitive data. Each of any other UEs in the group of UE1 through UEN may similarly apply an assigned pattern to repetitive data to be transmitted by that UE. As shown by reference number 140, UE1 through UEN may each transmit their respective repetitive data using the same set of radio resources (i.e., the set of radio resources (PRBs and/or subcarriers of PRBs) scheduled by the eNB). As shown by reference number 145, eNB may receive the repetitive data in the set of radio resources (PRBs and/or subcarriers of PRBs), and may apply each of pattern 1 through pattern N to the repetitive data. Here, based on applying each pattern to the data received in the set of radio resources, the eNB may differentiate the repetitive data transmitted by each of UE1 through UEN, respectively.

In this way, more efficient utilization of radio resources used for repetitive data transmissions is enabled (e.g., as compared to allowing a single UE to use a given set of radio resources at a given time). Furthermore, delay in a transmission by a UE is reduced (e.g., since multiple UEs may transmit more frequently and do not need to wait for the single UE to finish transmitting).

As indicated above, FIGS. 1A and 1B are provided merely as an example. Other examples are possible and may differ from what was described with regard to FIGS. 1A and 1B.

Figure 2:
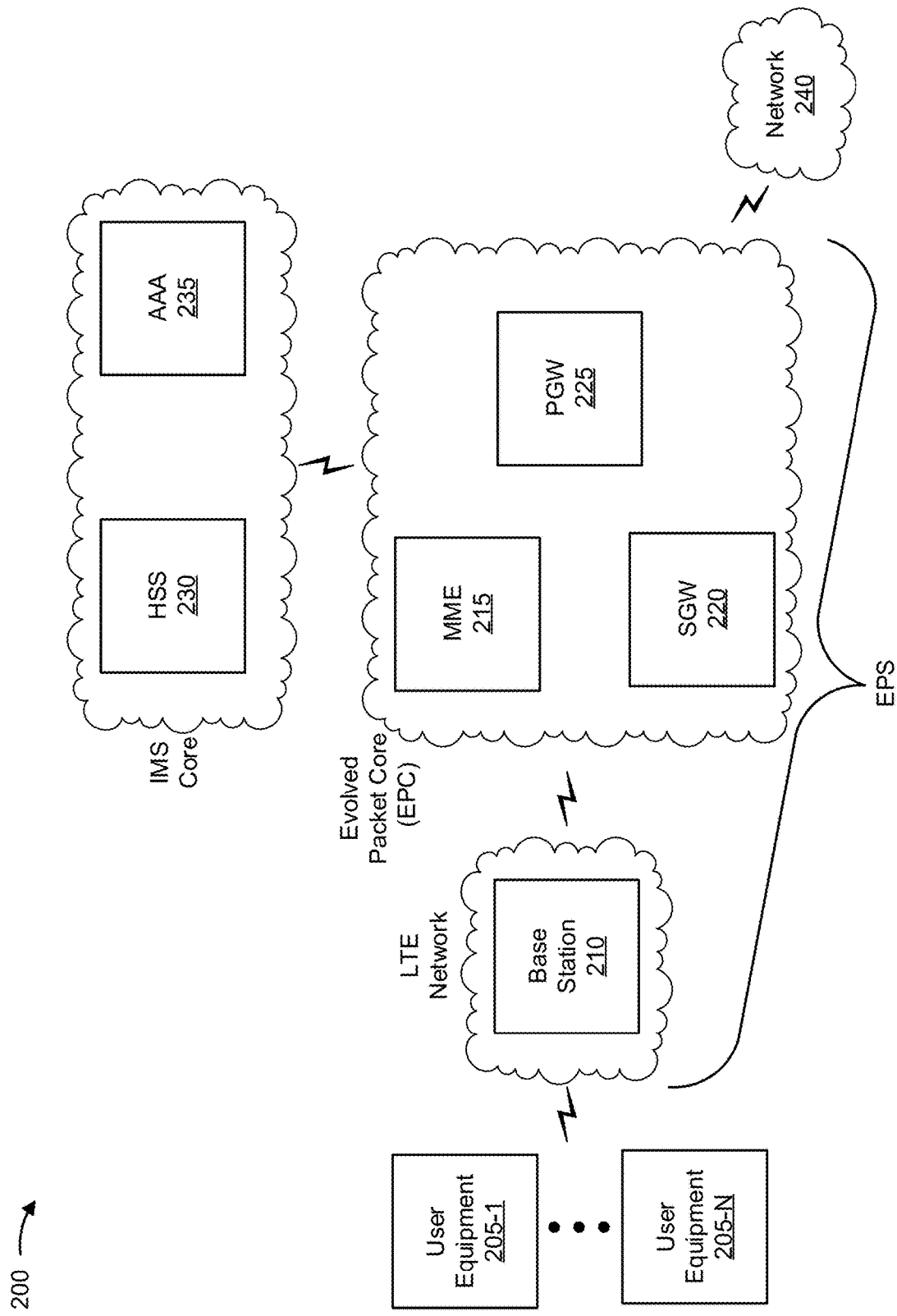
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include UEs 205-1 through 205-N (N>1); a base station 210; a mobility management entity device (MME) 215; a serving gateway (SGW) 220; a packet data network gateway (PGW) 225; a home subscriber server (HSS) 230; an authentication, authorization, and accounting server (AAA) 235; and a network 240. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network or a fifth generation (5G) network.

Environment 200 may include an evolved packet system (EPS) that includes an LTE network and/or an evolved packet core (EPC) that operate based on a third generation partnership project wireless communication standard. The LTE network may include a radio access network (RAN) that includes one or more base stations 210 that take the form of evolved Node Bs (eNBs) via which UE 205 communicates with the EPC. The EPC may include MME 215, SGW 220, and/or PGW 225 that enable UE 205 to communicate with network 240 and/or an Internet protocol (IP) multimedia subsystem (IMS) core. The IMS core may include HSS 230 and/or AAA 235, and may manage device registration and authentication, session initiation, etc., associated with UEs 205. HSS 230 and/or AAA 235 may reside in the EPC and/or the IMS core.

UE 205 includes one or more devices capable of communicating with base station 210 and/or a network (e.g., network 240). For example, UE 205 may include a mobile phone (e.g., a smart phone, a radiotelephone, etc.), a computing device (e.g., a desktop computer, a laptop computer, a tablet computer, a handheld computer, a camera, an audio recorder, a camcorder, etc.), an appliance (e.g., a refrigerator, a microwave, a stove, etc.), a medical device, a car, a light bulb, a sensor, a machine-to-machine (M2M) device, and/or any other smart device. In other words, UE 205 may be any "thing" in the IoT. In some implementations, UE 205 may send traffic to and/or receive traffic from network 240 (e.g., via base station 210, SGW 220, and/or PGW 225).

Base station 210 includes one or more devices capable of transferring traffic, such as audio, video, text, and/or other traffic, destined for and/or received from UE 205. In some implementations, base station 210 may include an eNB associated with the LTE network that receives traffic from and/or sends traffic to network 240 via SGW 220 and/or PGW 225. Additionally, or alternatively, one or more base stations 210 may be associated with a RAN that is not associated with the LTE network. Base station 210 may send traffic to and/or receive traffic from UE 205 via an air interface. In some implementations, base station 210 may include a small cell base station, such as a base station of a microcell, a picocell, and/or a femtocell.

MME 215 includes one or more devices, such as one or more server devices, capable of managing authentication, activation, deactivation, and/or mobility functions associated with UE 205. In some implementations, MME 215 may perform operations relating to authentication of UE 205. Additionally, or alternatively, MME 215 may facilitate the selection of a particular SGW 220 and/or a particular PGW 225 to serve traffic to and/or from UE 205. MME 215 may perform operations associated with handing off UE 205 from a first base station 210 to a second base station 210 when UE 205 is transitioning from a first cell associated with the first base station 210 to a second cell associated with the second base station 210. Additionally, or alternatively, MME 215 may select another MME (not pictured), to which UE 205 should be handed off (e.g., when UE 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 240 (e.g., via PGW 225) and/or other network devices associated with the EPC and/or the IMS core. SGW 220 may also receive traffic from network 240 and/or other network devices, and may send the received traffic to UE 205 via base station 210. Additionally, or alternatively, SGW 220 may perform operations associated with handing off UE 205 to and/or from an LTE network.

PGW 225 includes one or more devices capable of providing connectivity for UE 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 240. Additionally, or alternatively, PGW 225 may receive traffic from network 240, and may send the traffic to UE 205 via SGW 220 and base station 210. PGW 225 may record data usage information (e.g., byte usage), and may provide the data usage information to AAA 235.

HSS 230 includes one or more devices, such as one or more server devices, capable of managing (e.g., receiving, generating, storing, processing, and/or providing) information associated with UE 205. For example, HSS 230 may manage subscription information associated with UE 205, such as information that identifies a subscriber profile of a user associated with UE 205, information that identifies services and/or applications that are accessible to UE 205, location information associated with UE 205, a network identifier (e.g., a network address) that identifies UE 205, information that identifies a treatment of UE 205 (e.g., quality of service information, a quantity of minutes allowed per time period, a quantity of data consumption allowed per time period, etc.), and/or similar information. HSS 230 may provide this information to one or more other devices of environment 200 to support the operations performed by those devices.

AAA 235 includes one or more devices, such as one or more server devices, that perform authentication, authorization, and/or accounting operations for communication sessions associated with UE 205. For example, AAA 235 may perform authentication operations for UE 205 and/or a user of UE 205 (e.g., using one or more credentials), may control access, by UE 205, to a service and/or an application (e.g., based on one or more restrictions, such as time-of-day restrictions, location restrictions, single or multiple access restrictions, read/write restrictions, etc.), may track resources consumed by UE 205 (e.g., a quantity of voice minutes consumed, a quantity of data consumed, etc.), and/or may perform similar operations.

Network 240 includes one or more wired and/or wireless networks. For example, network 240 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
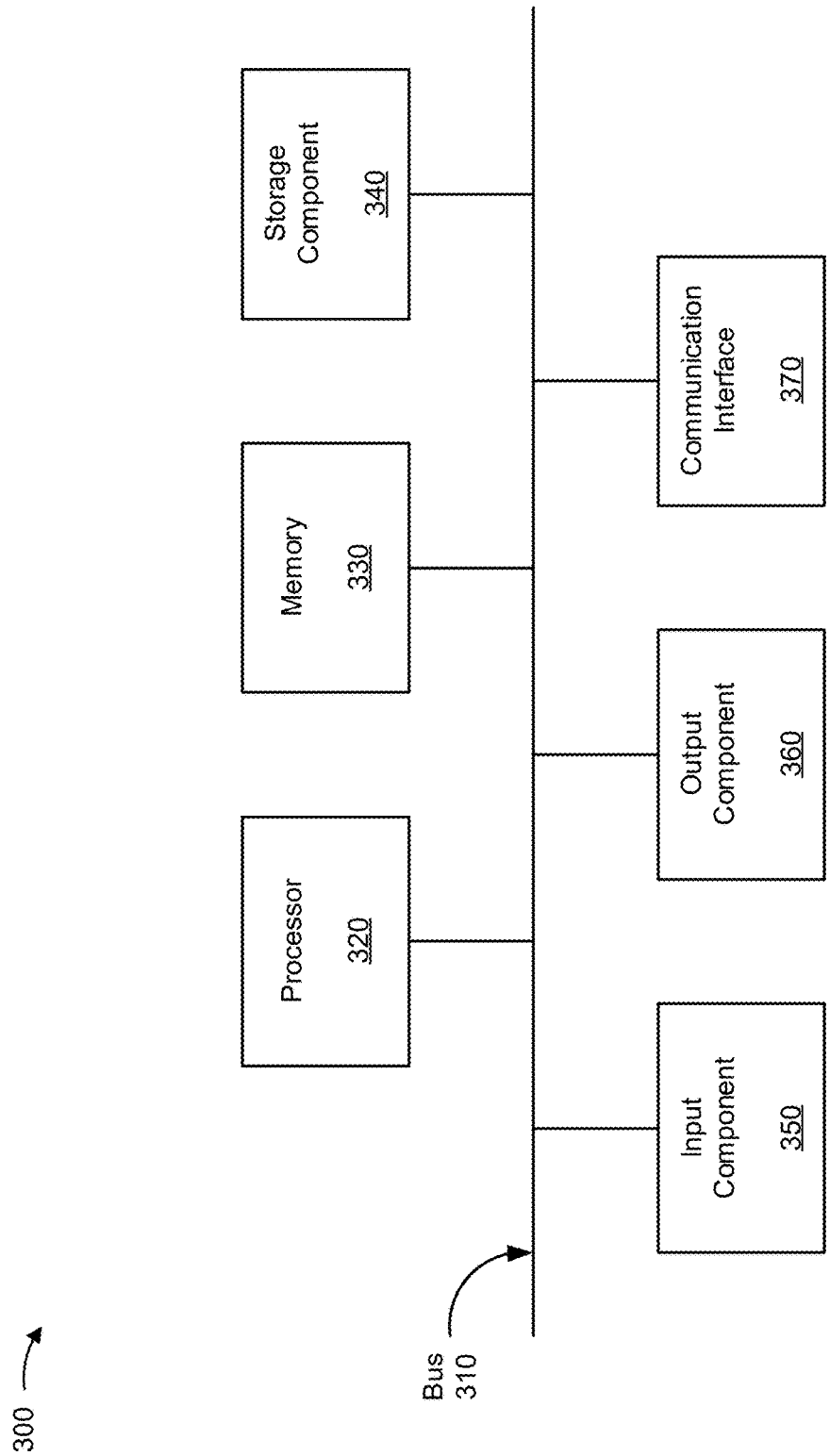
FIG. 3 is a diagram of example components of one or more devices of FIG. 2.

FIG. 3 is a diagram of example components of a device 300. Device 300 may correspond to UE 205, base station 210, MME 215, SGW 220, PGW 225, HSS 230 and/or AAA 235. In some implementations, UE 205, base station 210, MME 215, SGW 220, PGW 225, HSS 230 and/or AAA 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
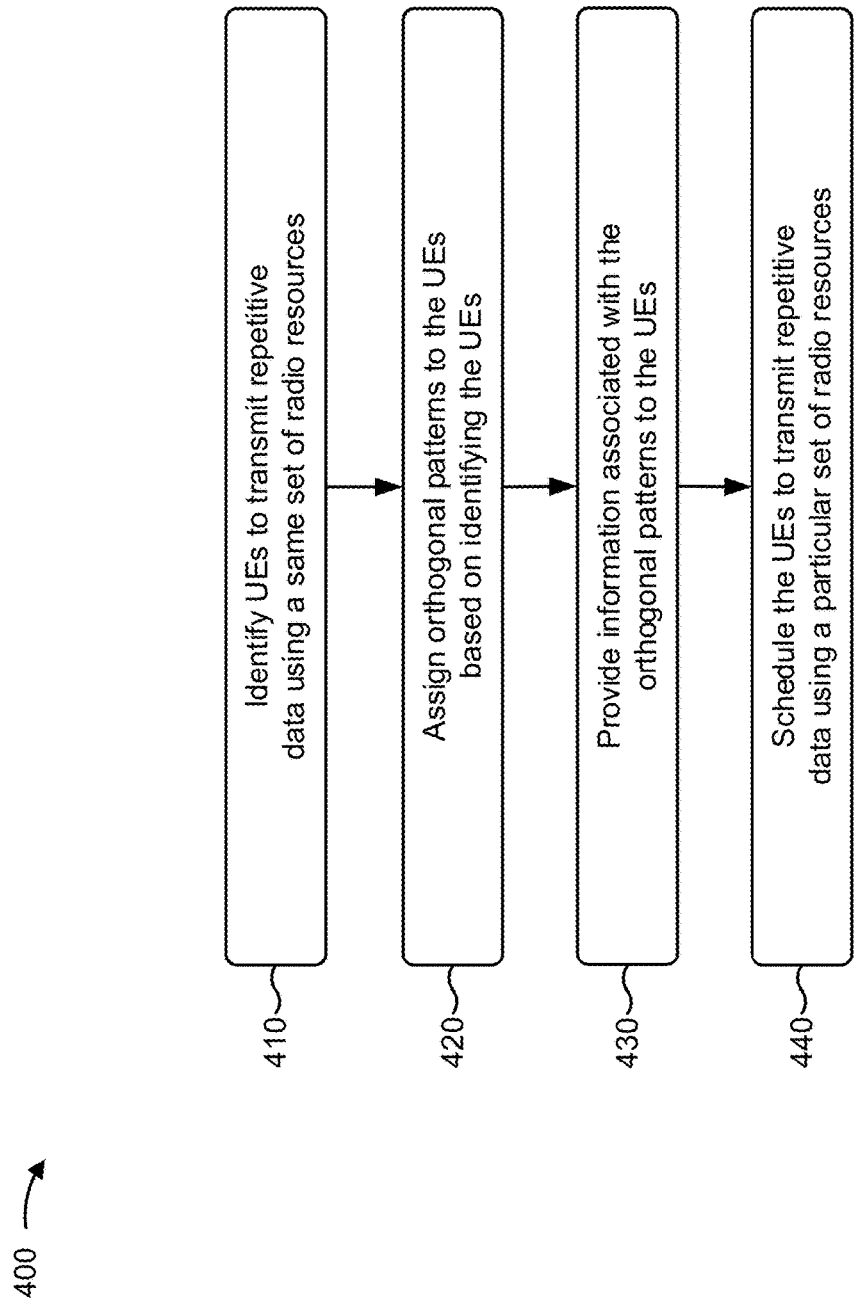
FIG. 4 is a flow chart of an example process for assigning orthogonal patterns to UEs and scheduling the UEs to transmit repetitive data using a same set of radio resources.

FIG. 4 is a flow chart of an example process 400 for assigning orthogonal patterns to UEs and scheduling the UEs to transmit repetitive data using a same set of radio resources. In some implementations, one or more process blocks of FIG. 4 may be performed by base station 210. In some implementations, one or more process blocks of FIG. 4 may be performed by another device or a group of devices separate from or including base station 210, such as MME 215, SGW 220, PGW 225, HHS 230 and/or AAA 235.

As shown in FIG. 4, process 400 may include identifying UEs to transmit repetitive data using a same set of radio resources (block 410). For example, base station 210 may identify UEs 205 to transmit repetitive data using a same set of radio resources.

In some implementations, repetitive data may include data that is transmitted multiple times by a first device for reception by a second device. For example, repetitive data may include data repeated by UE 205 to base station 210 (i.e., on the uplink) in consecutive subframes. In some implementations, repetitive data may be transmitted in order to improve coverage, as described above.

In some implementations, base station 210 may identify UEs 205 to transmit repetitive data using a same set of radio resources based on repetition times associated with UEs 205. A repetition time is an amount of time needed to transmit the repetitive data. For example, a repetition time may be 32 ms (e.g., such that a 1 ms subframe may be repeated 32 times).

In some implementations, base station 210 may determine the repetition time based on information associated with UE 205. For example, base station 210 may receive (e.g., from UE 205 during establishment of a connection between UE 205 and base station 210) information that identifies a number of times that UE 205 is to repeat data. Here, base station 210 may determine the repetition time as an amount of time needed to transmit the data the identified number of times. For example, where each repetition is one subframe in length, the repetition time matches the number of repetitions.

As another example, UE 205 may indicate, to base station 210 during establishment of a connection between UE 205 and base station 210, that UE 205 is a particular type of device and/or is associated with a particular application. Here, base station 210 may identify the repetition time based on information, accessible by base station 210, that associates repetition times with device types and/or applications. For example, in a case where UE 205 is a Voice over LTE (VoLTE) UE 205, base station 210 may determine the repetition time as 32 ms (e.g., when base station 210 stores information indicating that a VoLTE UE 205 performs 32 repetitions of data in 32 subframes).

In some implementations, base station 210 may identify the multiple UEs 205 as two or more UEs 205 with matching repetition times. For example, base station 210 may identify the multiple UEs 205 as a group of four UEs 205, each with a repetition time of 32 ms. Additionally, or alternatively, base station 210 may identify the multiple UEs 205 as two or more UEs 205 with different (but overlapping) repetition times. For example, base station 210 may identify the multiple UEs 205 as a group of three UEs 205, where a first UE 205 and a second UE 205 have repetition times of 32 ms and the third UE 205 has a repetition time of 16 ms.

In some implementations, base station 210 may take channel coherence times of the UEs 205 into account when identifying the UEs 205 to transmit repetitive data using a same set of radio resources. A coherence time is a temporal interval over which a phase of a radio wave at a given point can be predicted (i.e., where a channel impulse response is substantially invariant). Here, base station 210 may identify the multiple UEs 205 based on the repetition times and the channel coherence times. For example, base station 210 may identify the multiple UEs 205 based on a channel coherence time threshold, where a particular UE 205 may be grouped when a channel coherence time of the particular UE 205 satisfies (e.g., is longer than) the channel coherence time threshold.

As a particular example, base station 210 may identify the multiple UEs 205 as a group that includes a first UE 205 with a repetition time of 32 ms and a coherence time of 4 ms, a second UE 205 with a repetition time of 32 ms and a coherence time of 8 ms, and a third UE 205 with a repetition time of 16 ms and a coherence time of 4 ms. In this example, base station 210 may exclude a fourth UE 205 of the multiple UEs 205 when, for example, the fourth UE 205 has a repetition time of 32 ms and a coherence time of 1 ms and is configured with a coherence time threshold of 4 ms or longer. In some implementations, base station 210 may identity the multiple UEs 205 based on channel coherence times in order to ensure that a set of orthogonal patterns can be applied to repetitive data transmitted by the multiple UEs 205, as described below.

According to some implementations, the same set of radio resources may include a same set of PRBs (e.g., one or more PRBs). Accordingly, multiple UEs 205 may utilize a same set of PRBs of base station 210. Furthermore, in some implementations, the same set of radio resources may include a same set of subcarriers (e.g., one or more subcarriers) of a same set of PRBs of base station 210. Accordingly, base station 210 may utilize a same subcarrier of a same PRB to schedule repetitive data transmissions according to some implementations herein. As a more specific example, a PRB of base station 210 may include twelve subcarriers. In this case, multiple UEs 205 may transmit repetitive data on twelve different subcarriers of the PRB. As further described below, for a PRB with twelve subcarriers, using four orthogonal patterns (e.g., across four subframes) of each subcarrier, base station 210 may schedule repetitive data transmissions for up to 48 UEs to utilize the same PRB, with four UEs on each of the twelve subcarriers (i.e., 12 subcarriers×4 orthogonal patterns=48 slots of the same resource that can be used by up to 48 UEs). In some implementations, one UE 205 may utilize multiple subcarriers of a same PRB and/or multiple PRBs of base station 210. Accordingly, rather than a single UE 205 being able to use a PRB as described in previous techniques, base station 210 may allow for multiple UEs (e.g., up to 48, as described above, or more using additional spreading factors (longer repetitive subframe sequences and corresponding patterns, as described below)).

In this way, base station 210 may identify UEs that may be assigned orthogonal patterns to transmit repetitive data so that the UEs may use a same set of radio resources (e.g., same PRBs and/or same subcarriers of PRBs) of base station 210.

As further shown in FIG. 4, process 400 may include assigning orthogonal patterns to the UEs based on identifying the UEs (block 420). For example, base station 210 may assign, orthogonal patterns to the UEs 205 based on identifying the UEs 205.

An orthogonal pattern includes a pattern associated with switching a sign of (i.e., inverting) symbols included in a subframe, of a sequence of subframes (herein referred to as a segment or a segment of subframes), during transmission of repetitive data. For example, an orthogonal pattern may include a pattern such as (1 1 1 1), indicating that, for a segment including four repetitions of data (e.g., a data packet repeated in four consecutive subframes), signs of symbols in each subframe are not to be inverted. As another example, an orthogonal pattern may include pattern (1 1 −1

−1), indicating that, for a segment including four repetitions, signs of symbols in the first and second subframes are not to be inverted, and signs of symbols in the third and fourth subframes are to be inverted. As another example, an orthogonal pattern may include pattern (1-1) indicating that, for a segment including two repetitions of a subframe, signs of symbols in the first subframe are not to be inverted, and signs of symbols in the second subframe are to be inverted.

In some implementations, the orthogonal pattern may be 2, 4, 8, 16, 32, and/or the like, terms in length. Here, a quantity of possible orthogonal patterns depends on (e.g., is proportional to, matches, and/or the like) the length of the pattern. For example, when the orthogonal pattern is two terms in length, there are two possible orthogonal patterns (e.g., (1 1) and (1 −1)). As another example, when the orthogonal pattern is four terms in length, there are four possible orthogonal patterns (e.g., (1 1 1 1), (1 −1 1 −1), (1 1 −1 −1), and (1 −1 −1 1)). As another example, when the orthogonal pattern is 32 terms in length, there are 32 possible orthogonal patterns. In some implementations, base station 210 may select the length of the orthogonal pattern in the manner described below. In some implementations, the use of different orthogonal patterns allows base station 210 to differentiate repetitive data transmitted by the multiple UEs 205 using a same set of radio resources, as described below.

In some implementations, base station 210 may select a length of the orthogonal pattern such that the length of the orthogonal pattern is less than or equal to a maximum common divider of the repetition times of the multiple UEs 205. For example, a group of UEs 205 may include two UEs 205 with 32 ms repetition times and a third UE 205 with a 28 ms repetition time. In this case, base station 210 selects an orthogonal pattern length of 4, because 4 is the maximum common divider of 32 and 28. Selection of the orthogonal pattern based on the maximum common divider allows base station 210 to differentiate repetitive data transmitted by the group of UEs 205.

Additionally, or alternatively, base station 210 may select the length of the orthogonal pattern such that the length of the orthogonal pattern is less than or equal to a smallest channel coherence time associated with the multiple UEs 205. For example, a group of UEs 205 may include three UEs 205 with 8 ms coherence times and a fourth UE 205 with a 4 ms coherence time. In this case, base station 210 selects an orthogonal pattern length of 4, because 4 ms is the smallest coherence time of the group of UEs 205. Selection of the orthogonal pattern length in this manner may further help ensure that base station 210 will be able to accurately differentiate the data provided by the multiple UEs 205.

In some implementations, base station 210 may assign a different orthogonal pattern to each UE 205. For example, base station 210 may assign different orthogonal patterns based on a Walsh code (or Hadamard code) pattern, or another type of pattern. As a particular example, base station 210 may assign, to each of 4 different UEs 205, the different orthogonal patterns (1 1 1 1), (1 1 −1 −1), (1 −1 1 −1), and (1 −1 −1 1). In some implementations, base station 210 may store information that associates each UE 205 to a corresponding orthogonal pattern.

In some implementations, base station 210 may assign orthogonal patterns of different lengths to different UEs 205, as long as orthogonality is maintained between the assigned orthogonal patterns. For example, base station 210 may assign pattern (1 −1) to a first UE 205 and may assign pattern (1 1 1 1) to a second UE 205.

In this way, base station 210 may assign orthogonal patterns to UEs 205 to facilitate transmission of repetitive data.

As further shown in FIG. 4, process 400 may include providing information associated with the orthogonal patterns to the UEs (block 430). For example, base station 210 may provide information associated with the orthogonal patterns to the UEs 205.

In some implementations, base station 210 may provide the information to UEs 205 after base station 210 assigns the orthogonal pattern and/or based on base station 210 assigning the orthogonal pattern to UEs 205. For example, base station 210 may provide, to each UE 205, information associated with the orthogonal pattern assigned to the UE 205 after base station 210 assigns the orthogonal patterns (i.e., without scheduling a transmission by the multiple UEs 205). As a particular example, base station 210 may provide the information associated with the orthogonal pattern in downlink control information provided to UE 205.

In some implementations, base station 210 may define a set of orthogonal patterns with predetermined (or pre-specified) patterns. Accordingly, each base station 210 of a narrowband LTE system may define the set of orthogonal patterns for respective cells (for UEs 205 in communication with base station 210) of each base station 210. For example, orthogonal pattern information may be predefined for base station 210 by a standard (e.g., a 3GPP standard) or a network operator and assigned to base station 210 by a network device (e.g., MME 215), and/or broadcast to UEs 205. More specifically, if base station 210 uses four orthogonal patterns (e.g., (1 1 1 1), (1 1 −1 −1), (1 −1 1 −1), and (1 −1 −1 1)), base station 210 may send a pattern index to each UE 205 indicating which pattern is to be used by that UE 205. For example, a two-bit index may be sent for four patterns, where pattern index 00 assigns pattern 1 (i.e., 1 1 1 1) to UE 205, pattern index 01 assigns pattern 2 (i.e., 1 1 −1 −1), pattern index 10 assigns pattern 3 (i.e., 1 −1 1 −1), and pattern index 11 assigns pattern 4 (i.e., 1 −1 −1 1).

In some implementations, base station 210 may utilize a pattern mapping table to provide information to UEs 205. For example, the pattern mapping table may include a length of a repetitive pattern (e.g., a number of subframes that are to be repeated) to be used as well as a specified pattern to be used. As such, a mapping index indicates the length of the pattern (which may be referred to as a spreading factor) and the pattern to be used. The pattern mapping table may be pre-defined and/or broadcast to UEs 205. Accordingly, base stations 210 may provide a mapping index to each UE 205 to indicate which orthogonal pattern of a pattern mapping table is to be used by the UE 205 (see FIG. 7).

In this way, base station 210 may provide information associated with the orthogonal patterns to UEs 205 to facilitate scheduling the UEs to transmit the repetitive data.

As further shown in FIG. 4, process 400 may include scheduling the UEs to transmit repetitive data using a particular set of radio resources (block 440). For example, base station 210 may schedule the UEs 205 to transmit repetitive data using a particular set of radio resources.

In some implementations, base station 210 may provide the information associated with the orthogonal patterns to the multiple UEs 205 when base station 210 schedules the UEs 205 to transmit repetitive data using a particular set of radio resources. For example, base station 210 may identify a set of radio resources (e.g., PRBs and/or subcarriers of the PRBs) to be used for the transmission of repetitive data by the multiple UEs 205. Here, base station 210 may treat the multiple UEs 205 as a single UE 205, meaning that base station 210 schedules each of the multiple UEs 205 to use a same set of radio resources for transmission. In this example, base station 210 may provide, to each UE 205, scheduling information that identifies the set of radio resources to be used for the repetitive data transmission, and information associated with the orthogonal pattern assigned to the UE 205.

Base station 210 may schedule the UEs 205 to transmit repetitive data using the downlink control indicator (DCI) signals. In such cases, base station 210 may include PRB and/or subcarrier information for each of the UEs 205 in the respective DCI signals sent to the UEs 205. In some implementations, base station 210 may indicate an orthogonal pattern and/or a scrambling code on top of the orthogonal pattern that are to be applied by UEs 205 to reference signals of the UEs 205 (e.g., demodulation reference signals (DMRS)) to reduce interference between UEs 205 of a same cell and/or between UEs 205 in adjacent cells of base station 210 (which may have base stations utilizing a same pattern index scheme or mapping table index scheme as base station 210). In some implementations, a network device (e.g., MME 215) may assign a pattern index and/or mapping table to base station 210 and/or other base stations of neighboring cells. Accordingly, the network device may coordinate pattern assignments to reduce interference in accordance with some implementations herein. The example reference signal may provide information corresponding to which channel is to be used for transmission of repetitive data between base station 210 and UE 205. Because, in some implementations herein, subcarriers of a PRB of base station 210 may be allocated to UEs 205 (which may be referred to herein as sub-PRB allocation), transmissions with UEs 205 are no longer separated by frequency, and thus, reference signals for UEs 205 may no longer be separated by frequency. Furthermore, because there may be only one subcarrier used between two or more UEs 205, different shifts in transmissions of reference signals may not be applied.

Accordingly, in some implementations, base station 210 may indicate corresponding orthogonal patterns that are to be applied to reference signals of UEs 205 (in addition to the repetitive data transmissions). Furthermore, in some implementations, base station 210 may indicate a scrambling code (e.g., a randomly generated code specific to base station 210 and/or the cell of base station 210) is to be applied on top of the orthogonal pattern to randomize interference from UEs of neighboring cells. Accordingly, for a UE 205 and/or base station 210 to estimate a channel to be used for repetitive data transmission, UE 205 and/or base station 210 may process a reference signal using a scrambling code and/or corresponding orthogonal pattern to determine the channel from the reference signal.

In some implementations, base station 210 may implement an interference cancellation scheme when providing information associated with the orthogonal patterns. For example, an interference cancellation scheme may be utilized to account for mobility of UEs 205. In some instances, when UEs 205 move throughout a region (e.g., a cell) of base station 210, base station 210 may need to change channels to continue communication with UEs 205. Accordingly, when base station 210 changes channels to communicate with a single UE 205, orthogonality may be lost (e.g., especially for longer pattern lengths) as subframes may be lost and/or incoherently combined due to the channel change. Symbol level interference cancellation may not be feasible according to some implementations herein, as symbol level interference cancellation may not be combined with channel multiplexing. Accordingly, in some implementations described herein, a transmission time interval (TTI) level interference cancellation scheme may be applied to received repetitive data.

Figure 8A:
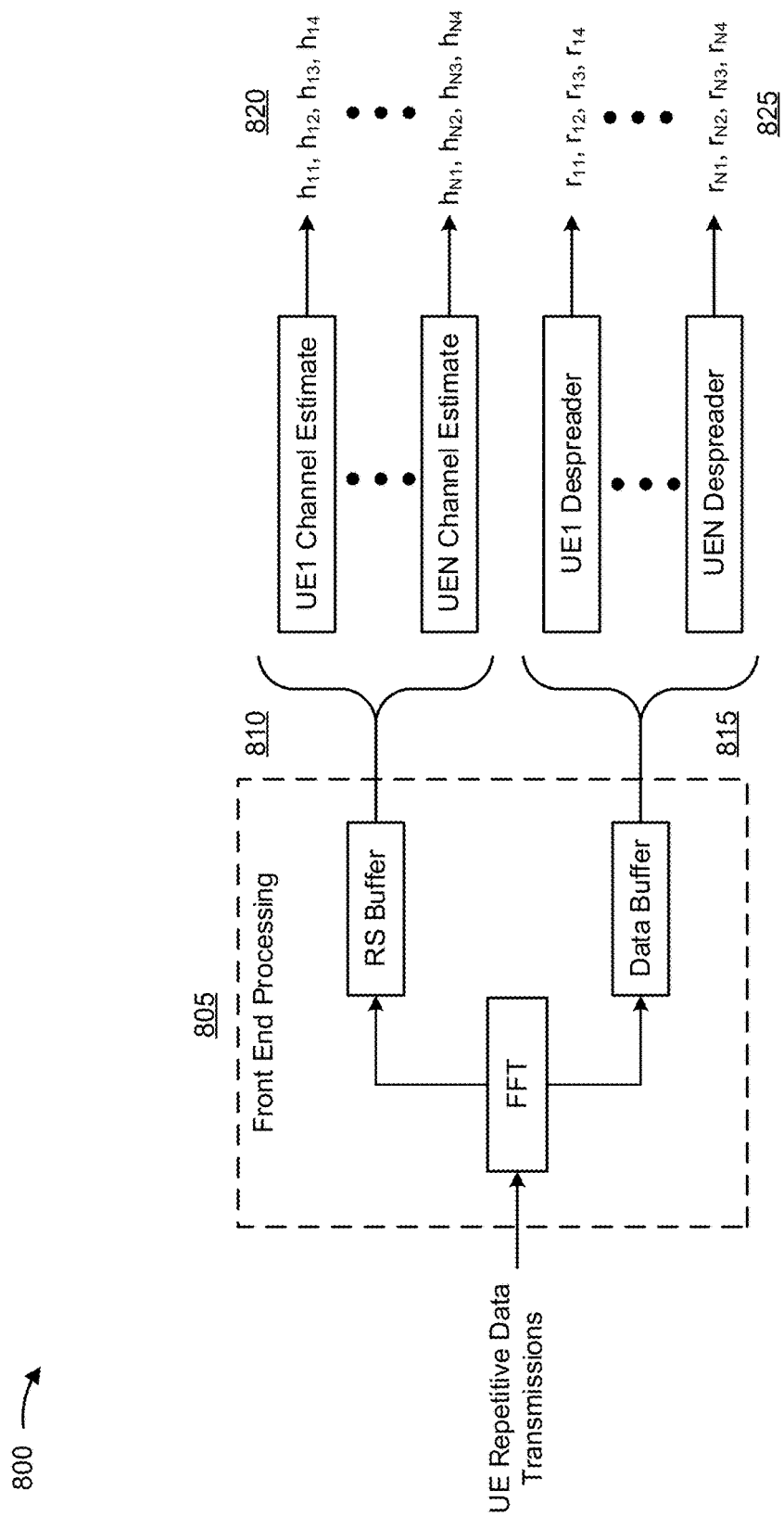
FIGS. 8A and 8B are diagrams of an example implementation relating to the example process shown in FIG. 5.
Figure 8B:
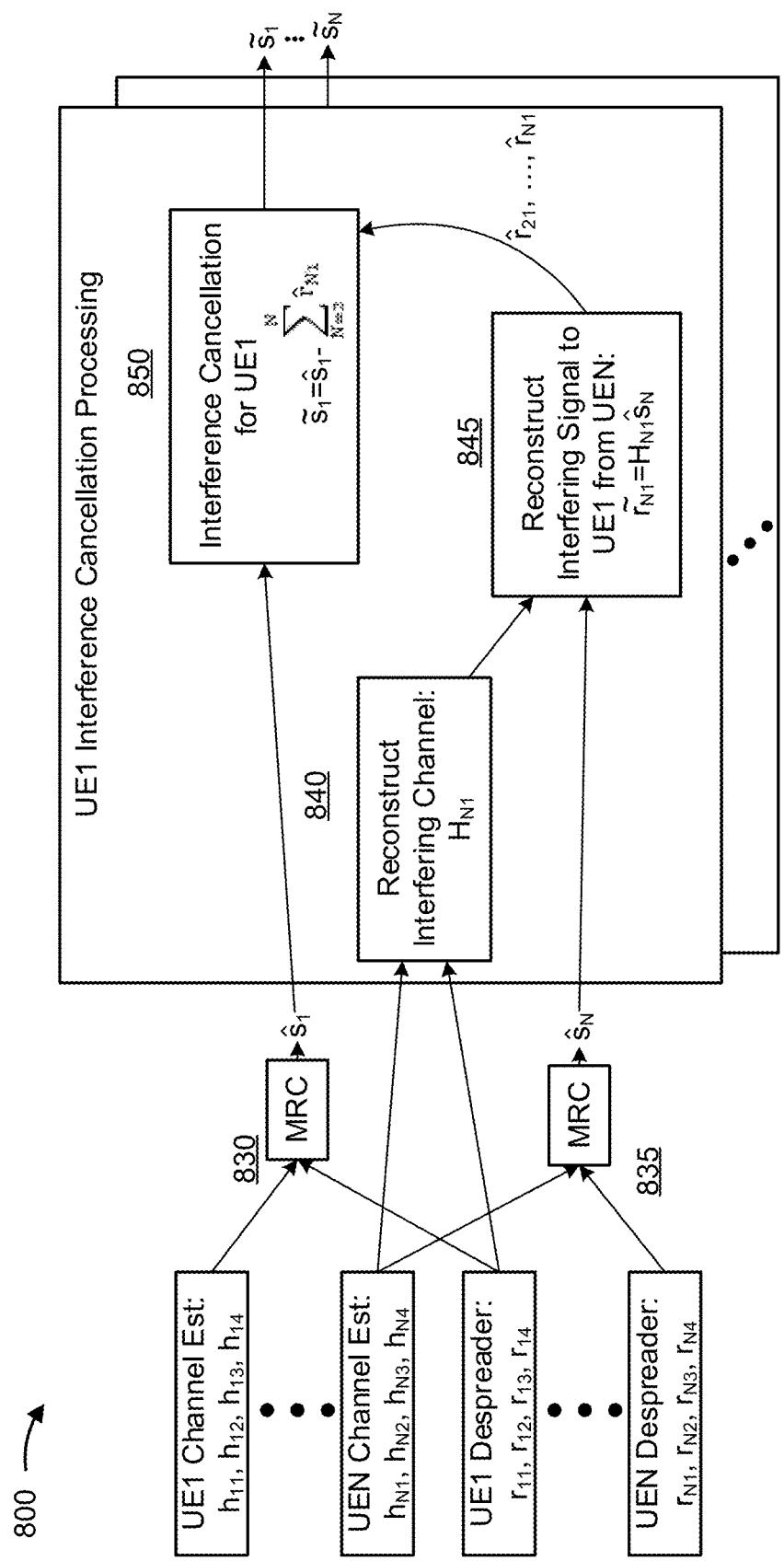

In some implementations, base station 210 may apply the TTI level interference cancellation scheme to separate communications from UEs 205 from one another at the pattern level (see FIGS. 8A-8B). According to some implementations, base station 210 may perform interference cancellation by utilizing channel multiplexing structure on a TTI level (rather than symbol level) without decoding feedback and without reconstructing received signals from baseband information bit streams. Furthermore, base station 210 for interference cancellation with a UE 205, may operate in TTI and process a despread channel (e.g., according to a length of the orthogonal pattern) of UE 205 where an interfering UE 205 may not be known to base station 210. Therefore, in some implementations herein, base station 210 performs interference cancellation on transmissions to/from UEs 205, which may account for various degrees of mobility (e.g., from a UE 205 that is stationary to a UE 205 that is moving (e.g., at speeds greater than a threshold speed, such as 30 kilometers/hour (km/h))).

In some implementations, base station 210 may schedule the UEs 205 to transmit repetitive data using a same set of radio resources in accordance with multiple user-multiple input, multiple output (MU-MIMO). Accordingly, base station 210 may schedule (e.g., via sub-PRB allocation and/or orthogonal patterns) UEs 205 to transmit repetitive data in accordance with spatial considerations corresponding to MU-MIMO. In some implementations, base station 210 may multiplex UEs 205 together that have relatively strong separation (e.g., UEs 205 that satisfy a threshold spatial separation measure) in a spatial domain to reduce interference. Accordingly, in such implementations utilizing MU-MIMO, base station 210 may implement and/or define additional orthogonal patterns for UEs 205. Furthermore, in some implementations, base station 210 may group UEs 205 for scheduling using MU-MIMO based on uplink power.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
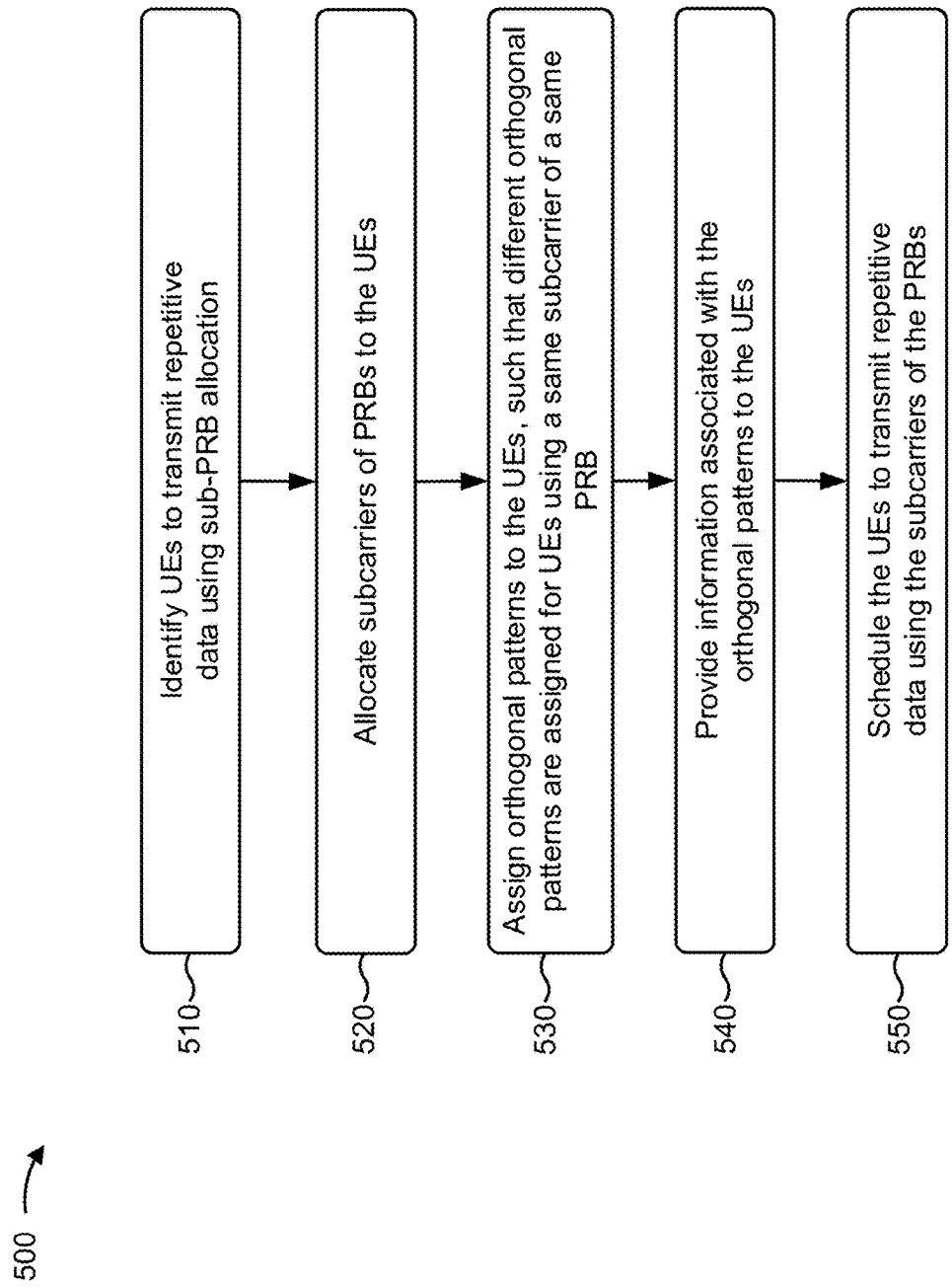
FIG. 5 is a flow chart of an example process for applying an orthogonal pattern to repetitive data and providing information associated with the orthogonal pattern.

FIG. 5 is a flow chart of an example process 500 for applying an orthogonal pattern to repetitive data and providing information associated with the orthogonal pattern. In some implementations, one or more process blocks of FIG. 5 may be performed by base station 210.

As shown in FIG. 5, process 500 may include identifying UEs to transmit repetitive data using sub-PRB allocation (block 510). For example, base station 210 may identify UEs 205 that are to transmit repetitive data using sub-PRB allocation.

In some implementations, base station 210 may identify UEs 205 to transmit repetitive data using sub-PRB allocation based on UEs 205 that are to utilize less than an entire PRB worth of bandwidth. As a more specific example, if base station 210 has six PRBs to support 1.4 MHz of bandwidth, if one of the UEs 205 requires less than 180 kHz of bandwidth, that UE 205 may be identified to use sub-PRB allocation.

In this way, base station 210 may identify UEs 205 that may be allocated subcarriers of PRBs of base station 210.

As further shown in FIG. 5, process 500 may include allocating subcarriers of PRBs to the UEs (block 520). For example, base station 210 may allocate subcarriers of PRBs of base station 210 to UEs 205.

In some implementations, base station 210 may identify available subcarriers of PRBs of base station 210 for UEs 205 to transmit repetitive data. Referring to the example above of base station 210 having 6 PRBs each supporting 180 kHz of bandwidth, for a UE 205 that requires 15 kHz of bandwidth to transmit repetitive data, base station 210 may allocate a single subcarrier of a PRB of base station 210 to that UE 205. In another example, a UE 205 that requires 90 kHz to transmit repetitive data, base station 210 may allocate six subcarriers of a PRB to that UE 205. In some implementations, the same subcarriers may be allocated to more than one UE 205 (e.g., using channel multiplexing as described herein).

In this way, base station 210 may allocate one or more subcarriers to UEs 205 that may be used to transmit repetitive data and more than one UE 205 may be allocated to a same subcarrier by assigning orthogonal patterns to UEs 205 on a same subcarrier.

As further shown in FIG. 5, process 500 may include assigning orthogonal patterns to the UEs, such that different orthogonal patterns are assigned for UEs using a same subcarrier of a same PRB (block 530). For example, base station 210 may assign orthogonal patterns to UEs 205 utilizing the same subcarriers and/or the same PRBs of base station 210. Base station 210 may assign orthogonal patterns to UEs 205 using a same PRB and/or a same set of subcarriers in a similar manner as described above with respect to block 420 of FIG. 4.

In this way, base station 210 may assign orthogonal patters to UEs, such that different orthogonal patterns are assigned for UEs using a same subcarrier of a same PRB.

As further shown in FIG. 5, process 500 may include providing information associated with the subcarriers and/or the orthogonal patterns to UEs (block 540). For example, base station 210 may provide the information associated with the subcarriers and/or orthogonal patterns to UEs 205.

In some implementations, base station 210 may directly send the orthogonal patterns to each of the UEs 205. In some implementations, base station 210 may use a predefined set of orthogonal patterns and an orthogonal pattern index is provided to each of the UEs 205 indicating which orthogonal pattern the UEs 205 are to use to transmit repetitive data. In some implementations, a mapping table of orthogonal patterns may be broadcast (e.g., by base station 210) or provided to UEs 205 and base station 210 may provide a mapping index to indicate a length of the orthogonal pattern and/or which orthogonal pattern is to be used.

In some implementations, UE 205 may transmit the repetitive data using the particular subcarrier and/or PRB after applying the orthogonal pattern, as described above. In this way, each UE 205, of the multiple UEs 205, may transmit respective repetitive data using the particular set of radio resources (e.g., such that the multiple UEs 205 concurrently transmit repetitive data using the same set of radio resources). This may improve efficiency in usage of PRBs of base station 210, as well as reduce transmission delay time associated with a given UE 205.

In this way, base station 210 may provide information associated with the orthogonal patterns to UEs 205 to enable base station 210 to schedule transmission of repetitive data.

As further shown in FIG. 5, process 500 may include scheduling the UEs to transmit repetitive data using the subcarriers of the PRBs (block 550). For example, base station 210 may schedule the UEs 205 to transmit repetitive data using the subcarriers of the PRBs of base station 210.

In some implementations, base station 210 may provide the information associated with the subcarriers and/or orthogonal patterns to the UEs 205 when base station 210 schedules the UEs 205 to transmit repetitive data using the subcarriers of the PRBs. For example, base station 210 identifies the subcarriers and/or orthogonal patterns to be used for the transmission of repetitive data by the multiple UEs 205. Accordingly, base station 210 may treat multiple UEs 205 as a single UE 205, meaning that base station 210 schedules each of the multiple UEs 205 to use a same set of subcarriers and/or PRBs for transmission of the repetitive data. In this example, base station 210 may provide, to each UE 205, scheduling information that identifies the subcarriers and/or the PRBs to be used for the repetitive data transmission, and information associated with the orthogonal pattern assigned to the UE 205.

In some implementations, base station 210 may provide information associated with subcarriers and/or PRBs to UEs 205 via uplink reference signals (e.g., DMRSs). For example, the reference signal may be used to indicate the particular channel(s), PRB(s), and/or subcarrier(s) that are to be used to transmit repetitive data. In some implementations, base station 210 may assign an orthogonal pattern to reference signals providing the information associated with the orthogonal pattern to the UEs 205. For example, the orthogonal pattern may be a same pattern that is to be applied to the repetitive data transmitted to/from UE 205. Additionally, or alternatively, base station 210 may provide the information using a scrambling code for the UE 205 (e.g., to prevent interference with UEs communicating with base stations in neighboring cells).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
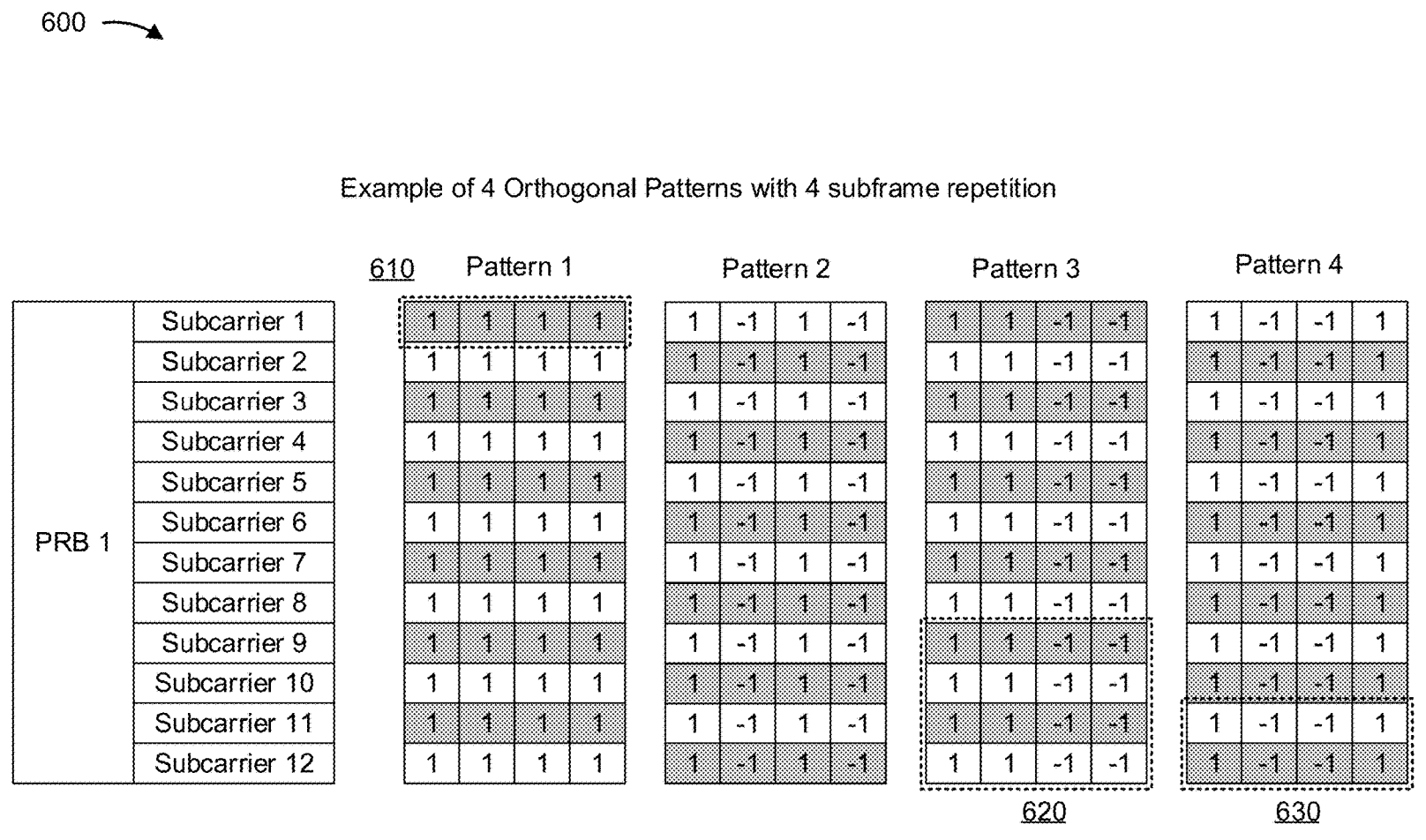

FIG. 6 is a diagram of an example implementation 600 relating to example process 500 shown in FIG. 5. FIG. 6 shows an example of allocation of subcarriers of a PRB to UEs using four orthogonal patterns and four subframe repetition.

As shown in FIG. 6, a PRB (PRB 1) includes subcarriers (subcarriers 1-12) and may be assigned four orthogonal patterns. In the example implementation 600, PRB 1, having twelve subcarriers (subcarriers 1-12) and four orthogonal patterns (patterns 1-4), may support up to 48 UEs 205 for transmission of repetitive data. For example, as shown by reference number 610 (and the surrounding dotted line), each set of four subframes for each subcarrier in each pattern may be individually assigned to UEs 205 for repetitive data transmission. In some implementations, a same UE 205 may use a block of subframes, as shown by reference number 620 (and the surrounding dotted line). Accordingly, as shown by reference numbers 620 and 630, base station 210 may allocate subcarriers 9-12 and assign pattern 3 to a first UE 205 and allocate subcarriers 11-12 and assign pattern 4 to a second UE 205 to allow transmission of repetitive data using a same subcarrier and/or same PRB 1.

Figure 7:
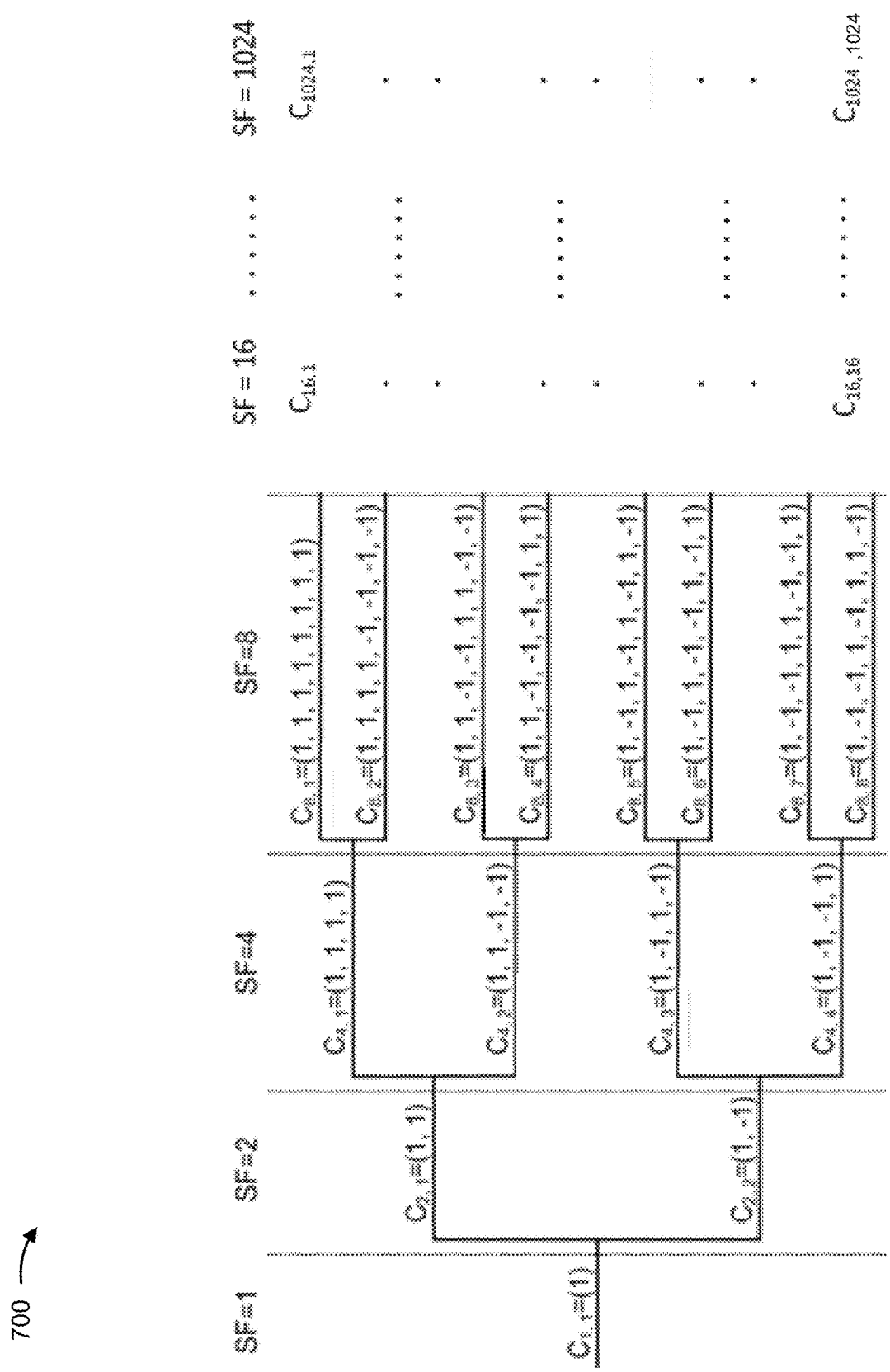
FIG. 7 is a diagram of an example implementation relating to the example process shown in FIG. 5.

FIG. 7 is a diagram of an example implementation 700 relating to example process 500 shown in FIG. 5. FIG. 7 shows an example of a mapping table that may be used to provide information associated with orthogonal patterns to UEs according to some implementations.

As shown in FIG. 7, the mapping table of example implementation 700 may include a length (or spreading factor (SF)) and orthogonal patterns designated as mapping index $C_{j,k}$ where j may be equal to $2^i$ (i being an integer from 0-10) as the spreading factor and k may be equal to 1-1024, corresponding to identifiers of orthogonal patterns to be used. Accordingly, spreading factor 16 may have 16 different orthogonal patterns, while spreading factor 1024 may have 1024 different orthogonal patterns. As such, base station 210 may send mapping index $C_{j,k}$ based on the assigned spreading factor and/or orthogonal pattern to UEs 205 that are to use a particular resource (e.g., subcarrier and/or PRB) of the base station 210. In some implementations, k may be specified or assigned based on a standard.

Accordingly, the mapping table of example implementation 700 may be used in accordance with some implementations described herein. In some implementations, the mapping table of FIG. 7 may be specified by a standard (e.g., a 3GPP standard), by a network operator, and/or broadcast to UEs 205 by base station 210.

FIGS. 8A and 8B are diagrams of an example implementation 800 relating to example process 500 shown in FIG. 5. FIGS. 8A and 8B show an example of an interference cancellation scheme that may be used in accordance with some implementations herein. For example, base station 210 may implement the example interference cancellation scheme of example implementation 800. In the example implementation 800 of FIGS. 8A and 8B, an example TTI level cancellation scheme is provided for four orthogonal patterns with a despreading factor of four TTIs to account for mobility of UEs.

As shown in FIG. 8A and by reference number 805, base station 210 may perform front end processing on transmissions from UEs 205. As shown in FIG. 8A, base station 210 may perform a Fast Fourier Transform (FFT) on received UE repetitive data transmissions. From the FFT of the repetitive data transmissions, base station 210 may parse the reference signal (RS) from the data signal and provide the reference signal data to an RS buffer and the data signal to a data buffer. To perform channel processing, from the RS buffer, as shown by reference number 810, base station 210 performs a channel estimate of the reference signal for UE1-UEN. For demodulation, from the data buffer, as shown by reference number 815, base station 210 uses a despreader (with a despreading factor of four) for data from UE1-UEN to extract and/or parse repetitive data of UE1-UEN from the data buffer. As shown by reference number 820 and reference number 825, a channel estimate is made for UE1 ($h_{11}$, $h_{12}$, $h_{13}$, $h_{14}$) to UEN ($h_{N1}$, $h_{N2}$, $h_{N3}$, $h_{N4}$) and demodulated data is determined for UE1 ($r_{11}$, $r_{12}$, $r_{13}$, $r_{14}$) to UEN ($r_{N1}$, $r_{N2}$, $r_{N3}$, $r_{N4}$). Accordingly, in FIG. 8A, the example implementation 800 may enable base station 210 to estimate a channel and/or demodulated data from the UEs 205.

Referring now to FIG. 8B, an interference cancellation process is provided. In FIG. 8B, as shown by reference numbers 830 and 835, the UE1 channel estimate is combined with the UE1 demodulated data and the UEN channel estimate is combined with the UEN demodulated data via Maximum Ratio Combiners (MRC), to form signals $\hat{s}_1$ and $\hat{s}_N$, respectively. In the example implementation 800, as shown by reference number 840, base station 210 reconstructs an interference channel ($H_{N1}$) from the UEN channel estimate and the UE1 demodulated data. For example, to reconstruct the interference channel ($H_{N1}$), if the pattern of UE1 is (1 1 1 1) and the pattern of UEN is (1 −1 −1 1), then $H_{N1} = h_{n1} - h_{n2} - h_{n3} + h_{n4}$. As shown by reference number 845, base station 210 reconstructs the interfering signal to UE1 from UEN ($\widetilde{r}_{N1} = H_{N1}\hat{s}_n$). From there, as shown by reference number 850, base station 210 may perform an interference cancellation for UE1 from $\hat{s}_1$ and the reconstructed interfering signal to UE1 from UEN, such that $\widetilde{s}_1 = \hat{s}_1 \Sigma_{N=2}^{Nt} \widetilde{r}_{N1}$, where $\widetilde{s}_1$ may be decoded (e.g., using the appropriate orthogonal pattern) to determine the repetitive data transmitted from UE1 without interference. Accordingly, if UE1 is mobile (e.g., moving at approximately 30 km/h or faster), base station 210 may utilize the interference cancellation scheme in the example implementation 800. In some implementations, the example interference cancellation scheme of example implementation 800 may be implemented regardless of whether UE1 is mobile (e.g., if UE1 is not mobile, the interference cancellation scheme may determine that an interfering signal is zero (or non-existent), which does not need to be cancelled).

As indicated above, FIGS. 8A and 8B are provided merely as an example. Other examples are possible and may differ from what was described with regard to FIGS. 8A and 8B.

Some implementations described herein may provide for channel multiplexing that allows a base station to receive and decode repetitive data transmissions from multiple UEs that use the same set of radio resources (e.g., same PRBs and/or same subcarriers of PRBs) to transmit the repetitive data. This allows more efficient utilization of radio resources used for repetitive data transmissions (e.g., as compared to allowing a single UE to use a given set of radio resources at a given time). Furthermore, delay in a transmission by a UE may be reduced (e.g., since multiple UEs may transmit more frequently).

In this way, uplink capacity is increased. For example, some implementations may provide up to $2^n$ times more efficiency in uplink resource usage, leading to a $2^n$ increase in capacity, where n is an integer chosen by base station 210 (e.g., based on repetition times and/or channel coherency of UEs 205). For example, $2^n$ may be a length of a Walsh code. Here, if base station 210 chooses the Walsh code to be 32 bits long, then up to 32 UEs 205 may be multiplexed together sharing the same radio resources. In this case, n is equal to 5 (e.g., $2^5=32$).

Furthermore, capacity advantages are provided without impacting coverage or requiring base station 210 to perform additional process intensive steps (e.g., there is no duplication of discrete Fourier transformation by base station 210). Moreover, examples are provided for providing information associated with orthogonal patterns to UEs 205. Some implementations may include providing an index (e.g., a pattern index or a mapping index) rather than sending the pattern (e.g., to conserve bandwidth).

In some implementations, orthogonal patterns and/or scrambling codes may be applied to reference signals to schedule transmissions from UEs 205. Accordingly, interference among UEs 205 in communication with a same base station 210 and/or UEs 205 in communication with a neighboring base station may not interfere with one another when scheduling is taking place.

Furthermore, in some implementations, an interference cancellation scheme may be implemented on a link level to account for mobility of the UEs 205. Accordingly, repetitive data may not be lost due to changes in channels and inaccurate assembly of the repetitive data.

The foregoing disclosure provides illustration and description, but is not intended to be exhaustive or to limit the implementations to the precise form disclosed. Modifications and variations are possible in light of the above disclosure or may be acquired from practice of the implementations.

For example, while implementations described herein are described in the context of a relatively small number of UEs (e.g., four UEs), in some implementations, the techniques described herein may be applied to a relatively large number of UEs, such as a relatively large number (e.g., 30, 60, 100, 1,000, and/or the like) of IoT devices. Here, each of the IoT devices may have a relatively low data demand, but may have a simultaneous or near-simultaneous access time and/or wake-up time at which the IoT devices are to transmit repetitive data. In such a case, the above described techniques may be applied in order to efficiently and effectively allow the IoT devices to use the same set of radio resources to simultaneously transmit their respective repetitive data.

As another example, while implementations described herein are described in the context of uplink channel multiplexing, in some implementations, similar techniques may be applied to downlink channel multiplexing. In such a case, a base station may transmit different data to multiple UEs using a same set of radio resources. This may permit a voice activity factor to be taken advantage of (e.g., since otherwise downlink radio resource may be still allocated even if there is no downlink traffic) and/or may allow power control to be taken advantage of such that an amount of transmission power used is reduced (e.g., as compared to transmitting to each UE individually using different radio resources).

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A base station, comprising:
a memory; and
one or more processors to:
receive repetitive data transmitted using a set of subcarriers of a physical resource block (PRB);
apply a transmission time interval (TTI) level interference cancellation scheme to the received repetitive data,
the TTI level interference cancellation scheme being associated with a first orthogonal pattern and a second orthogonal pattern,
the TTI level interference cancellation scheme to separate communication from a first user equipment (UE) and a second UE at a pattern level, and
the TTI level interference cancellation scheme utilizing a channel multiplexing structure on a TTI level without decoding feedback and without reconstructing received signals from baseband information bit streams;
apply the first orthogonal pattern, assigned to the first UE, to a segment of subframes of the received repetitive data;
apply the second orthogonal pattern, assigned to the second UE, to the segment of subframes of the received repetitive data,
the second orthogonal pattern being different from the first orthogonal pattern, and
where information associated with the first orthogonal pattern or information associated with the second orthogonal pattern comprise at least one of:
a pattern index identifying the first orthogonal pattern or the second orthogonal pattern, or
a mapping index identifying the first orthogonal pattern and a first spreading factor for the first UE and the second orthogonal pattern and a second spreading factor for the second UE;
determine a first repetitive data, transmitted by the first UE using the set of subcarriers, based on applying the first orthogonal pattern to the segment of subframes of the received repetitive data; and
determine a second repetitive data, transmitted by the second UE using the set of subcarriers, based on applying the second orthogonal pattern to the segment of subframes of the received repetitive data.

2. The base station of claim 1, where the one or more processors are further to:

identify the first UE and the second UE as UEs that are to transmit repetitive data using the set of subcarriers of the PRB; and assign the first orthogonal pattern to the first UE and the second orthogonal pattern to the second UE based on identifying the first UE and the second UE as UEs that are to transmit repetitive data using the set of subcarriers of the PRB.

3. The base station of claim 1, where the one or more processors are further to:

provide information associated with the first orthogonal pattern to the first UE based on assigning the first orthogonal pattern to the first UE; and provide information associated with the second orthogonal pattern to the second UE based on assigning the second orthogonal pattern to the second UE.

4. The base station of claim 1, where the one or more processors, when applying the first orthogonal pattern to the segment of subframes of the received repetitive data, are to:

selectively invert symbols in a subframe, of the segment of subframes, in accordance with the first orthogonal pattern.

5. The base station of claim 1, where the one or more processors are further to:

apply the first orthogonal pattern to a first reference signal to schedule transmission of the first repetitive data from the first UE; and apply the second orthogonal pattern to a second reference signal to schedule transmission of the second repetitive data from the second UE.

6. A non-transitory computer-readable medium storing instructions, the instructions comprising:

one or more instructions that, when executed by one or more processors, cause the one or more processors to:

receive repetitive data transmitted using a set of subcarriers of a physical resource block (PRB);

apply a transmission time interval (TTI) level interference cancellation scheme to the received repetitive data, the TTI level interference cancellation scheme being associated with a first orthogonal pattern and a second orthogonal pattern, the TTI level interference cancellation scheme to separate communication from a first user equipment (UE) and a second UE at a pattern level, and the TTI level interference cancellation scheme utilizing a channel multiplexing structure on a TTI level without decoding feedback and without reconstructing received signals from baseband information bit streams;

apply the first orthogonal pattern, assigned to the first UE, to a segment of subframes of the received repetitive data;

apply the second orthogonal pattern, assigned to the second UE, to the segment of subframes of the received repetitive data, the second orthogonal pattern being different from the first orthogonal pattern, and where information associated with the first orthogonal pattern or information associated with the second orthogonal pattern comprise at least one of:

a pattern index identifying the first orthogonal pattern or the second orthogonal pattern, or a mapping index identifying the first orthogonal pattern and a first spreading factor for the first UE and the second orthogonal pattern and a second spreading factor for the second UE;

determine a first repetitive data, transmitted by the first UE using the set of subcarriers, based on applying the first orthogonal pattern to the segment of subframes of the received repetitive data; and determine a second repetitive data, transmitted by the second UE using the set of subcarriers, based on applying the second orthogonal pattern to the segment of subframes of the received repetitive data.

7. The non-transitory computer-readable medium of claim 6, where the one or more instructions, when executed by the one or more processors, further cause the one or more processors to:

identify the first UE and the second UE as UEs that are to transmit repetitive data using the set of subcarriers of the PRB; and assign the first orthogonal pattern to the first UE and the second orthogonal pattern to the second UE based on identifying the first UE and the second UE as UEs that are to transmit repetitive data using the set of subcarriers of the PRB.

8. The non-transitory computer-readable medium of claim 6, where the one or more instructions, when executed by the one or more processors, further cause the one or more processors to:

provide information associated with the first orthogonal pattern to the first UE based on assigning the first orthogonal pattern to the first UE; and provide information associated with the second orthogonal pattern to the second UE based on assigning the second orthogonal pattern to the second UE.

9. The non-transitory computer-readable medium of claim 6, where the one or more instructions, when executed by the one or more processors, further cause the one or more processors to:

selectively invert symbols in a subframe, of the segment of subframes, in accordance with the first orthogonal pattern.

10. The non-transitory computer-readable medium of claim 6, where the one or more instructions, when executed by the one or more processors, further cause the one or more processors to:

apply the first orthogonal pattern to a first reference signal to schedule transmission of the first repetitive data from the first UE; and apply the second orthogonal pattern to a second reference signal to schedule transmission of the second repetitive data from the second UE.

11. A method, comprising:

receiving repetitive data transmitted using a set of subcarriers of a physical resource block (PRB);

applying a transmission time interval (TTI) level interference cancellation scheme to the received repetitive data, the TTI level interference cancellation scheme being associated with a first orthogonal pattern and a second orthogonal pattern, the TTI level interference cancellation scheme to separate communication from a first user equipment (UE) and a second UE at a pattern level, and the TTI level interference cancellation scheme utilizing a channel multiplexing structure on a TTI level without decoding feedback and without reconstructing received signals from baseband information bit streams;

applying the first orthogonal pattern, assigned to the first UE, to a segment of subframes of the received repetitive data;

applying the second orthogonal pattern, assigned to the second UE, to the segment of subframes of the received repetitive data, the second orthogonal pattern being different from the first orthogonal pattern, and where information associated with the first orthogonal pattern or information associated with the second orthogonal pattern comprise at least one of:

a pattern index identifying the first orthogonal pattern or the second orthogonal pattern, or a mapping index identifying the first orthogonal pattern and a first spreading factor for the first UE and the second orthogonal pattern and a second spreading factor for the second UE;

determining a first repetitive data, transmitted by the first UE using the set of subcarriers, based on applying the first orthogonal pattern to the segment of subframes of the received repetitive data; and determining a second repetitive data, transmitted by the second UE using the set of subcarriers, based on applying the second orthogonal pattern to the segment of subframes of the received repetitive data.

12. The method of claim 11, further comprising:

identifying the first UE and the second UE as UEs that are to transmit repetitive data using the set of subcarriers of the PRB; and assigning the first orthogonal pattern to the first UE and the second orthogonal pattern to the second UE based on identifying the first UE and the second UE as UEs that are to transmit repetitive data using the set of subcarriers of the PRB.

13. The method of claim 11, further comprising:

providing information associated with the first orthogonal pattern to the first UE based on assigning the first orthogonal pattern to the first UE; and providing information associated with the second orthogonal pattern to the second UE based on assigning the second orthogonal pattern to the second UE.

14. The method of claim 11, further comprising:

applying the first orthogonal pattern to a first reference signal to schedule transmission of the first repetitive data from the first UE; and applying the second orthogonal pattern to a second reference signal to schedule transmission of the second repetitive data from the second UE.

15. The base station of claim 1, where the one or more processors perform at least one of:

send the first orthogonal pattern directly to the first UE and the second orthogonal pattern directly to the second UE; or provide the pattern index or the mapping index to the first UE and the second UE.

16. The non-transitory computer-readable medium of claim 6, where the one or more instructions, when executed by the one or more processors, cause the one or more processors to perform at least one of:

send the first orthogonal pattern directly to the first UE and the second orthogonal pattern directly to the second UE; or provide the pattern index or the mapping index to the first UE and the second UE.

17. The method of claim 11, further comprising at least one of:

sending the first orthogonal pattern directly to the first UE and the second orthogonal pattern directly to the second UE; or providing the pattern index or the mapping index to the first UE and the second UE.

18. The base station of claim 1, wherein the first spreading factor indicates a length of the first orthogonal pattern and the second spreading factor indicates a length of the second orthogonal pattern.

19. The non-transitory computer-readable medium of claim 6, wherein the first spreading factor indicates a length of the first orthogonal pattern and the second spreading factor indicates a length of the second orthogonal pattern.

20. The method of claim 11, wherein the first spreading factor indicates a length of the first orthogonal pattern and the second spreading factor indicates a length of the second orthogonal pattern.

* * * * *